United States Patent [19]

Stephens

[11] Patent Number: 5,260,391
[45] Date of Patent: Nov. 9, 1993

[54] TETRAPOLYMERIZATION PRODUCT OF 2-ACRYLAMIDO-2-METHYL PROPANE SULFONIC ACID/ASSOCIATED SALTS, N-VINYL PYRROLIDONE, ACRYLAMIDE, AND ACRYLIC ACID/ASSOCIATED SALTS

[76] Inventor: Michael Stephens, 1344 Johnstone, Bartlesville, Okla. 74005

[21] Appl. No.: 670,501

[22] Filed: Mar. 15, 1991

Related U.S. Application Data

[63] Continuation of Ser. No. 414,961, Sep. 28, 1989, abandoned, which is a continuation-in-part of Ser. No. 29,029, Mar. 23, 1987, abandoned.

[51] Int. Cl.$^5$ ............................................. C08F 228/02
[52] U.S. Cl. .................................... 526/240; 523/130; 526/264; 526/287
[58] Field of Search ........................ 526/287, 240, 264

[56] References Cited

U.S. PATENT DOCUMENTS

| | | | |
|---|---|---|---|
| 4,521,679 | 6/1985 | Engelhardt | 526/287 |
| 4,587,283 | 5/1986 | Hille | 524/3 |
| 4,743,666 | 5/1988 | Engelhardt | 526/240 |
| 4,749,498 | 6/1988 | Lange | 252/8.514 |
| 4,764,574 | 8/1988 | Clark, Jr. | 526/207 |

*Primary Examiner*—Christopher Henderson

[57] ABSTRACT

A unique tetrapolymer and an additive package for reducing water loss from cement comprising a tetrapolymer, base, and electrolyte, at least one surfactant, and water is disclosed. A process for producing cement slurries with improved water loss properties, as well as an improved method for cementing gas and oil wells is also disclosed.

4 Claims, No Drawings

TETRAPOLYMERIZATION PRODUCT OF 2-ACRYLAMIDO-2-METHYL PROPANE SULFONIC ACID/ASSOCIATED SALTS, N-VINYL PYRROLIDONE, ACRYLAMIDE, AND ACRYLIC ACID/ASSOCIATED SALTS

This application is a continuation of application Ser. No. 07/414,961 filed Sep. 28, 1989, now abandoned which is a continuation-in-part of application Ser. No. 07/029,029, filed Mar. 23, 1987, now abandoned.

The present invention pertains to cement additives which are useful for preventing water loss from cement slurries. Another aspect of the invention relates to novel tetrapolymers and the use of said novel tetrapolymers as cement additives. Another aspect of the invention relates to cement slurries which have improved water loss properties. A still further aspect of the invention relates to an improved process for cementing oil and gas wells.

BACKGROUND OF THE INVENTION

Cement compositions are used in the oil and gas industry to cement the annular space in the well bore between the surrounding formation and the pipe or casing. Typically, the cement slurry is pumped down inside the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for the particular job.

Many times the hydraulic cement must be placed within or next to a porous medium, for example, shale strata encountered in the well bore. When this happens, water tends to filter out of the slurry and into the strata during the setting of the cement. Many difficulties are related to an uncontrolled fluid loss of this type, such as uncontrolled setting rate, improper placement of the slurry, impaired strength properties, and contamination of the surrounding strata. These conditions are all undesirable in oil and gas well cementing operations.

In order to lessen the loss of fluid from the aqueous cement slurry, various materials have been employed in the past. Unfortunately, these materials often have adverse effects upon the cement itself.

For example, U.S. Pat. No. 4,015,991 teaches the use of a copolymer of acrylamide and 2-acrylamido-2-methylpropanesulfonic acid as a fluid loss additive for cement slurries. Although this copolymer will reduce the fluid loss from cement slurries, it also has the undesirable effect of reducing the compressive strength of the cement and of retarding the rate at which the cement sets.

A further problem with the fluid loss additives currently available is their ineffectiveness at temperatures in the range of 300° F. to 450° F. For example, the copolymer described in U.S. Pat. No. 4,015,991 is ineffective at a temperature in excess of 250° F.

Thus, it would be a valuable contribution to the art to develop additives which would reduce water loss from cement slurries without having adverse effects upon the compressive strength of the cement or the rate at which the cement solidifies.

It would also be a valuable contribution to the art to develop additives which would reduce the water loss from cement slurries at elevated temperatures.

SUMMARY OF THE INVENTION

It is an object of the present invention to provide additives which will reduce the water loss from cement slurries without reducing the compressive strength of the cement or delaying the rate at which the cement solidifies.

It is a further object of the present invention to provide additives that will prevent the loss of water from cement slurries at elevated temperatures.

It is a further object of the present invention to provide a method for reducing the loss of water from cement slurries without reducing the compressive strength of the cement or delaying the rate at which the cement solidifies.

It is yet another object of the present invention to provide a method for reducing the loss of water from cement slurries at an elevated temperature.

It is also an object of the present invention to provide cement compositions having improved water loss properties at elevated temperatures.

It is yet a further object of the present invention to provide an improved method for cementing oil and gas wells.

It is additionally an object of the present invention to provide water soluble polymer compositions which provide improved water loss properties in cement compositions.

In accordance with one embodiment of the present invention I have discovered that the addition of tetrapolymers to a cementing composition will reduce the water loss from said cementing composition.

In accordance with another embodiment of the present invention, I have discovered that an additive comprising (A) a tetrapolymer, (B) an electrolyte, (C) a base, (D) at least one surfactant, and (E) water, will reduce the water loss from cement slurries without reducing the compressive stength of the cement or delaying the rate at which the cement solidifies. It has also been discovered that this additive will control the water loss from cement slurries at elevated temperatures.

In an additional embodiment of the present invention it has also been discovered that tetrapolymers made in a highly energetic polymerization process provides improved water loss control.

DETAILED DESCRIPTION

As used in this application the term tetrapolymer refers to the polymerization product of at least a four monomer component polymerization. The four monomer components suitable for the practice of the present invention are:

Component A which has the formula

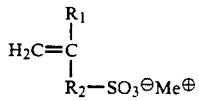

wherein $R_1$ is hydrogen or methyl, $R_2$ is an alkyl amido group containing $C_2$–$C_{10}$ alkylene group, an alkyl containing $C_1$–$C_{10}$ carbon atoms, benzyl, or alkyl benzyl containing $C_7$–$C_{16}$ carbon atoms and Me is hydrogen, lithium, sodium or potassium;

Component B which has the formula

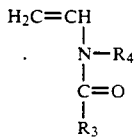

wherein $R_3$ is hydrogen, methyl, or ethyl, $R_4$ is hydrogen, methyl, or ethyl or $R_3$ and $R_4$ form a cyclic amide;

Component C which has the formula

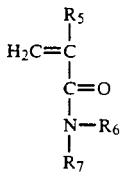

wherein $R_5$ is hydrogen or methyl, and $R_6$ and $R_7$ are independently hydrogen, methyl, ethyl or propyl; and Component D, which has the formula

wherein $R_8$ is hydrogen or methyl and $R_9$ is a carboxylic acid, carboxylic salt, ester of a carboxylic acid, sulfonic acid, sulfonate or nitrile.

Suitable examples of component A include but are not limited to compounds selected from the group consisting of 2-acrylamido-2-methylpropanesulfonic acid, salts of 2-acrylamido-2-methylpropanesulfonate, alkylvinyl sulfonic acids, alkyl vinyl sulfonates, vinyl benzene sulfonic acids, vinyl benzene sulfonates, alkyl vinyl benzene sulfonic acids, alkyl vinyl benzene sulfonates, and combinations of two or more thereof.

Suitable examples of monomer component B include but are not limited to compounds selected from the group consisting of N-vinyl acetamide, N-vinyl-W-methyl acetamide N,N-dimethyl acetamide, N-vinyl-2-pyrrolidone, N-ethenyl-N-alkyl acetamide, and combinations of two or more thereof.

Suitable examples of monomer component C include but are not limited to ethylenically unsaturated N-substituted carboxylic acids selected from the group consisting of acrylamide, methyl acrylamide methylmethacryamide, N-alkylmethacrylamide, N,N-dialkylmethacrylamide, N-alkylacrylamide, N,N-dialkylacrylamide, and combinations of any two or more thereof.

Suitable examples of monomer component D include but are not limited to compounds selected from the group consisting of acrylic acid, salts of acrylic acid, methacrylic acid, salts of methacrylic acid, itaconic acid, salts of itaconic acid, acrylonitrile, alkoxy esters of acrylic acid, alkoxy esters of methacrylic acid, vinyl sulfonate, vinyl sulfonic acid and combinations of any two or more thereof.

As used in this application, the term tetrapolymer broadly refers to a water soluble polymer which is composed of a) from 1 to 60 weight percent of component B, b) from 1 to 60 weight percent of component C, c) from 10 to 90 weight percent of component A, and d) from 1 to 60 weight percent of component D.

One preferred tetrapolymer contains from 30 to 40 weight percent of N-vinyl-2-pyrrolidone, from 5 to 15 weight percent of acrylamide, from 50 to 60 weight percent of sodium 2-acrylamido-2-methylpropane sulfonate, and from 1 to 10 weight percent of acrylic acid.

Currently the preferred tetrapolymer composition comprises a) from about 10 to about 61 weight percent of monomer component A; b) from about 10 to about 60 weight percent of monomer component B; c) from about 3 to about 60 weight percent of monomer component C; and d) from at least 10 to about 55 weight percent of component D. Additionally, for specific applications in fresh water and brine water, the following monomer component ratios are recommended:

| Fresh Water | Monomer Component A | Monomer Component B | Monomer Component C | Monomer Component D |
| --- | --- | --- | --- | --- |
| 125° F. | | | | |
| Broad Range | 10–55 | 10–40 | 5–60 | 10–55 |
| Preferred Range | 20–38 | 20–30 | 23–35 | 14–20 |
| 200° F. | | | | |
| Broad Range | 10–55 | 10–30 | 15–45 | 10–20 |
| Preferred Range | 28–38 | 20–25 | 23–34 | 14–15 |
| 300° F. | | | | |
| Broad Range | 10–55 | 10–30 | 3–60 | 10–55 |
| Preferred Range | 27–55 | 10–30 | 5–35 | 10–55 |
| Brine Water 200° F. | | | | |
| Broad Range | 10–55 | 10–30 | 15–60 | 10–30 |
| Preferred Range | 15–45 | 20–30 | 20–45 | 10–20 |

The currently most preferred tetrapolymer composition comprises a) from about 15 to about 45 weight percent of monomer coponent A; b) from about 10 to about 30 weight percent of monomer component B; c) from about 20 to about 45 weight percent of monomer component C; and d) from about 10 to about 20 weight percent of monomer component D. This particular tetrapolymer composition is believed to provide the best water loss control of any water loss control polymer tested to date. Tetrapolymers of this composition show extremely good water loss control over a broad range of temperatures in fresh water and brine solutions. The preferred monomers for making this tetrapolymer composition are a) 2-acrylamido-2-methylpropane sulfonic acid or sodium 2-acrylamido-2-methylpropane sulfonate, b) N-vinyl-2-pyrrolidone; c) acrylamide; and d) sodium acrylate or acrylic acid.

The tetrapolymers of the present invention can be prepared by polymerization in accordance with any of the well known free radical techniques in solution, suspension or emulsion environment. See, for example, U.S. Pat. No. 3,547,899, or European patent application No. 0115836. In addition, other methods of polymerization known to one skilled in the art may be employed.

Preferred for the practice of the present invention is the polymerization of the four monomer components in a highly energetic polymerization process wherein a significant excess of initiation energy is provided by chemical or electromagnetic means including electrons, gamma rays, x-rays, slow neutrons and ultra violet radiation. The utilization of excess initiation energy appears to result in the formation of consistently better tetrapolymers for use in water loss control. By way of guidance but in no way limiting to the present invention it has been found that a 100 percent excess of a chemical initiator such as 2,2′azobis(N,N′-dimethylene isobutyramidine) dihydrochloride is effective to produce tetrapolymers with improved water loss control.

The molecular weight of the tetrapolymers of the present invention may be varied over a considerable range. The molecular weight may be as low as 30,000 or as high as 1,000,000 or more.

In one embodiment of the present invention I have discovered that tetrapolymers alone or in combination with other additives is very effective as a water loss control additive. The tetrapolymers disclosed in this invention are in fact so effective that when provided alone in an effective amount for hydraulic cements, a tetrapolymer may be the only additive required for water loss control. When utilized as a water loss control additive in hydraulic cements the tetrapolymer should be employed in an amount ranging from about 0.1 weight percent to about 5 weight percent by weight of dry hydraulic cement, preferably the tetrapolymer will be employed in an amount ranging from about 0.2 weight percent to about 2 weight percent by weight of dry hydraulic cement. The weight ranges specified above may be optimized for the particular cement and conditions under which it is utilized.

The monomer ratios as specified above for Fresh Water and Brine Water (at various temperatures) are particularly preferred in cement slurries which will be subjected to conditions similar to those specified above.

Additionally, it has been discovered that an additive comprising (A) a tetrapolymer, (B) an electrolyte, (C) a base, (D) at least one surfactant, and (E) water, will reduce the water loss from cement slurries without reducing the compressive strength of the cement or delaying the rate at which the cement solidifies. It has also been discovered that this additive will control the water loss from cement slurries at elevated temperatures.

Suitable electrolytes (B) for use in the present invention can be selected from the group consisting of sodium, potassium, lithium, or ammonium salts of chlorine, bromine, iodine, nitrate, or fluorine. At the present time, the preferred electrolyte is potassium chloride.

Suitable bases (C) for use in the present invention include those selected from the group consisting of potassium hydroxide, sodium hydroxide, or ammonium hydroxide. The presently preferred base is potassium hydroxide.

Suitable (D) surfactants for use in the present invention can be selected from the group consisting of:

1) carboxylates of the formula $$RCOO^-M^+$$

wherein R is selected from the group consisting of alkyl groups containing from 9 to 21 carbon atoms and M is selected from the group consisting of sodium, potassium, or lithium;

2) polyalkoxycarboxylates represented by the formula $$R-[OCH_2CH_2]_nCH_2\overset{O}{\underset{\|}{C}}-O^-M^+$$

wherein R is selected from the group consisting of alkyl and alkylaryl groups containing from 10 to 21 carbon atoms, M is selected from the group consisting of sodium, lithium or potassium, and n is an integer from 5 to 21;

3) sulfonates of the formula $$R\ SO_3^-M^+$$

wherein R is selected from the group consisting of alkyl groups containing from 10 to 20 carbon atoms, and M is selected from the group consisting of sodium, potassium, or lithium;

4) alkylbenzene sulfonates represented by the formula $$RC_6H_4SO_3^-M^+$$

wherein R is selected from the group consisting of alkyl groups containing from 10 to 20 carbon atoms, and M is selected from the group consisting of sodium, lithium, or potassium;

5) lignosulfonates;
6) naphthalene sulfonates of the formula $$RC_{10}H_6SO_3^-M^+$$

wherein R is selected from the group consisting of alkyl groups containing from 3 to 10 carbon atoms, and M is selected from the group consisting of sodium, lithium, calcium or potassium;

7) naphthalene sulfonates which have been condensed with formaldehyde;

8) the alpha-olefin sulfonates of the formula $$RC=CHSO_3^-M^+$$

wherein R is selected from the group consisting of alkyl groups containing from 10 to 20 carbon atoms and M is selected from the group consisting of potassium, sodium or lithium;

9) poly(ethylene glycol) monomethyl ethers of the formula $$HO-(CH_2CH_2O)_xCH_3$$

wherein x can vary from about 20 to about 225,000.

10) polyethylene glycols of the formula $$HO(CH_2CH_2O)_xH$$

wherein x can vary from about 20 to about 225,000.

11) alcohol ethoxylates of the formula $$R[OCH_2CH_2]_nOH$$

wherein R is selected from the group consisting of alkyl groups containing from 6 to 20 carbon atoms and n is an integer from 2 to 100;

12) alkylphenyl ethoxylates of the formula $$RC_6H_4(OC_2H_4)_nOH$$

wherein R is selected from the group consisting of alkyl groups containing from 8 to 15 carbon atoms and n is an integer from 2 to 70; and 13) petroleum sulfonates.

All of these surfactants as well as their methods of preparation are well known to those skilled in the art. They are available from numerous commercial suppliers.

At the present time it is preferred that the cement slurry water loss additive contain two surfactants.

One of the preferred surfactants is poly(ethylene glycol) monomethyl ether. The surfactant will have a molecular weight ranging from about 200 to about 8000, preferably 200 to 1000. Presently Dow Froth 1012 ® with molecular weight of about 385 is the most preferred.

The other preferred surfactant is a naphthalene sulfonate formaldehyde condensate. Such compounds are also known as sulfonated condensation products of formaldehyde and naphthalene or metal salts of condensation products of naphthalene sulfonic acid with formaldehyde.

Naphthalene sulfonate formaldehyde condensates suitable for use in the present invention are marketed by a number of companies under various brands and the preparation of some of these are set forth, for example, in U.S. Pat. Nos. 3,537,869 or 4,814,887. Examples of commercially available naphthalene sulfonate formaldehyde condensates are Lomar D ®, CFR-2 ® Tamol ®, SM ®, TIC ®, and Daxad ®. Currently Lomar D ® is the preferred naphthalene sulfonate formaldehyde condensate.

At the present time, it is also preferred that the water loss additive contain (F), a preservative. The nature of the preservative is not critical to the practice of the present invention and any commercially available preservative is suitable for use in the present invention. At the present time, the preferred preservative is paraformaldehyde.

The constituents of the water loss additive are present in the following quantities:

|   |   | Broad Range wt % | Preferred Range wt % |
|---|---|---|---|
| A | Tetrapolymer | 0.1–70 | 1.5–10 |
| B | Electrolyte | 0.1–37.2 | 2–10 |
| C | Base | 0.1–3 | .2–2 |
| D | Surfactant | 0.1–40 | 5–15 |
| E | Water | 29–95 | 70–80 |
| F | Preservative (optional) | 0.001–5 | |

The fluid additive of the present invention is suitable for use with any hydraulic cement. The term hydraulic cement is meant to encompass any organic cement that hardens or sets under water. Hydraulic cements, for example, include portland cements, aluminus and pozzolan cements, and the like. The term hydraulic cement is also intended to include cements having minor amounts of extenders such as bentonite, gilsonite, and is also intended to include cements used either without any appreciable sand or aggregate material or such cements admixed with a granular filling material such as sand, ground limestone, and the like. Thus, for example, any of the class A–J cements listed in API Spect 10, Section 2, First Ed., January, 1982, are suitable for this purpose. Strength enhancers such as silica powder can also be employed.

The dry hydraulic cement component, the fluid loss additive of the present invention, can be admixed dry or with water to form a pumpable, settable cement slurry. The cement slurry will set to form a monolithic solid. The water which is employed to form the cement slurry may be any naturally occurring water suitable for preparing cement slurries. Sea water may be employed and is thus convenient in offshore operations. It is a particular advantage of the fluid loss additive of the present invention that it is effective in reducing fluid loss from cement slurries even where brines are empolyed to make up the slurry. This constitutes another important advantage of the invention over many other cement additives known in the art.

The amount of water employed to make up the hydraulic cement slurry is not critical, and generally the amount of water necessary to give a settable cement composition having the required characteristics will be an amount from about 25 to about 150 percent by weight, based on the weight of the dry hydraulic cement. As discussed previously, the amount of water employed should be only such as is sufficient to produce a pumpable slurry. Use of the water loss additive of the present invention makes it unnecessary to add excess water in anticipation of substantial water losses.

Generally, the amount of fluid loss additive employed will be in the range of from 0.2 gal to 2.5 gal of additive per 94 lbs. of cement utilized in preparing the cement slurry.

The fluid loss additive of the present invention is suitable for use in cement slurries that are subjected to temperatures ranging from 80° F. to 450° F.

In the method of cementing a well bore with the present additive, a hydraulic cement, water and the fluid loss additive of the present invention are mixed together to form a pumpable slurry. The cement slurry so prepared is then pumped to the desired location in the well bore and allowed to harden to form a solid mass.

The following examples are intended to illustrate the advantages of this invention, but are not intended to unduly limit this invention.

EXAMPLE I

The purpose of this example is to demonstrate the composition of and a method for preparing the preferred fluid loss additive of the present invention.

The composition of the preferred fluid loss additive system of the present invention is represented below.

TABLE I

| Material | Amount (wt in grams) |
|---|---|
| Water | 78 |
| KCl | 2 |
| KOH | 1 |
| Paraformaldehyde | 0.02 |
| Sodium naphthalene formaldehyde condensate[1] | 9.8 |
| Poly(ethylene glycol) monomethyl ether[2] | 4 |
| Tetrapolymer[3] | 5 |

[1]Lomar D ®, Diamond Shamrock
[2]Dow Froth 1012 ®, Dow
[3]a poly(sodium 2-acrylamido-2-methylpropane sulfonate-co-N-vinyl-2-pyrrolidone-co-acrylamide-co-acrylic acid), containing 55 wt % sodium 2-acrylamido-2-methylpropane sulfonate, 35 wt % N-vinyl-2-pyrrolidone, 10 wt % acrylamide, 5 wt % acrylic acid and is commercially available as HE ® polymer from Phillips Petroleum Company.

A preferred manner of preparing this fluid loss additive is to mix the ingredients in the order listed under agitation.

EXAMPLE II

A series of cementing slurry compositions in accordance with the present invention and having the compositions as noted in Table II below were prepared by mixing the additive system of Example I with water and a Class H cement.

TABLE II

| Material | Amount | Amount water loss in gal/sack of cement |
|---|---|---|
| Cement A | | |
| Class H cement | 829.85 gm | 0.3 gal |
| Water | 313.5 ml | |

TABLE II-continued

| Material | Amount | Amount water loss in gal/sack of cement |
|---|---|---|
| Water loss additive | 22.2 ml | |
| Cement B | | |
| Class H cement | 829.85 gm | 0.41 gal |
| Water | 305.5 ml | |
| Water loss additive | 30.3 ml | |
| Cement C | | |
| Class H cement | 829.85 gm | 0.60 gal |
| Water | 285.5 ml | |
| Water loss additive | 50.2 ml | |
| Cement D | | |
| Class H cement | 829.85 gm | 0.68 gal |
| Water | 285.5 ml | |
| Water loss additive | 50.1 ml | |
| Cement E | | |
| Class H cement | 829.85 gm | 0.75 gal |
| Water | 280.42 ml | |
| Water loss additive | 55.2 ml | |
| Cement F (control) | | |
| Class H cement | 829.85 gm | 0 |
| Water | 335.7 ml | |
| Cement G (control) | | |
| Class H cement | 850.96 gm | 0 |
| Water | 328.9 ml | |
| Cement H | | |
| Class H cement[1] | 645.92 gm | 0.41 gal |
| Sand | 226.1 gm | |
| Water | 284.35 ml | |
| Water loss additive | 23.51 ml | |
| Cement I | | |
| Class H cement | 645.92 gm | 0.60 gal |
| Sand | 226.1 gm | |
| Water | 273.46 ml | |
| Water loss additive | 34.4 ml | |
| Cement J | | |
| Class H cement | 645.92 gm | 0.75 gal |
| Sand | 226.1 gm | |
| Water | 264.86 ml | |
| Water loss additive | 43.0 ml | |
| Cement K | | |
| Class H cement | 829.05 gm | .80 gal |
| Water | 275.8 ml | |
| Water loss additive | 58.9 ml | |
| Cement L | | |
| Class H cement | 829.85 gm | 1.00 gal |
| Water | 261.1 ml | |
| Water loss additive | 73.7 ml | |

[1] A Class H cement as defined in API Spec 10, Section 2.2, First Ed., January 1982. The cement used is commercially available from General Portland under the brand name TRINITY LAFARGE H ®

EXAMPLE III

To demonstrate that the water loss additive of the present invention will reduce the water loss from cement slurries over a broad range of temperatures; the water loss properties of cementing slurry compositions prepared as in Example II were determined in accordance with API Spec 10, Appendix F, First Ed., January 1982.

The following results were obtained.

TABLE III

| Cement | Concentration of Additive (gal/94 lbs cement) | Temp. °F. | Fluid-Loss cc/30' |
|---|---|---|---|
| B | 0.41 | 80 | 66 |
| B | 0.41 | 100 | 76 |
| D | 0.68 | 100 | 40 |
| F (control) | 0.00 | 100 | +1298 |
| B | 0.41 | 125 | 74 |
| D | 0.68 | 125 | 46 |
| F (control) | 0.00 | 125 | +1298 |
| B | 0.41 | 170 | 80 |

TABLE III-continued

| Cement | Concentration of Additive (gal/94 lbs cement) | Temp. °F. | Fluid-Loss cc/30' |
|---|---|---|---|
| D | 0.68 | 170 | 46 |
| F (control) | 0.00 | 170 | +1500 |
| H | 0.41 | 170 | 78 |
| I | 0.60 | 170 | 48 |
| H | 0.41 | 200 | 118 |
| I | 0.60 | 200 | 131 |
| I | 0.60 | 230 | 138 |
| I | 0.60 | 250 | 40 |
| J | 0.75 | 300 | 54 |

The water loss properties of cement slurries prepared without the additive of the present invention (cement F) were determined at temperatures ranging from 100° F. to 170° F. These cement slurries lost between 1298 to 1500 cc of fluid during the 30 minute testing period.

The water loss properties of cement slurries prepared with the additive of the present invention were determined at temperatures ranging from 80° F. to 300° F. These cement only lost from 40 to 138 cc of fluid during the 30 minute testing period.

Thus, this data demonstrates that the additive of the present invention provides cements with superior water loss properties over a broad temperature range.

EXAMPLE IV

To demonstrate that the fluid loss additive of the present invention does not decrease the compressive strength of the resulting cement composition, a series of cement compositions as prepared in Example II were tested in accordance with API Spec 10, Section 7, Compressive Strength Tests, First Ed., January 1982.

The following data was generated.

TABLE IV

| Cement | Concentration of Additive (gal/94 lbs of cement) | 24 Hr COMPRESSIVE STRENGTH (PSI) | | | |
|---|---|---|---|---|---|
| | | @ Atmospheric pressure | | @ 3000 PSI | |
| | | 80° F. | 125° F. | 150° F. | 170° F. |
| F (control) | 0.00 | 1483 | 3517 | 4646 | 4799 |
| A | 0.30 | 1483 | 3725 | 4697 | 4713 |
| B | 0.41 | 1508 | 3642 | 4689 | 5013 |
| C | 0.68 | 1550 | 3775 | 5847 | 6192 |

Cement F was prepared without the fluid loss additive of the present invention. It demonstrated a compressive strength of 1483 PSI at 80° F. during a 24 hour compressive strength test.

Cements A, B, and C were prepared with the fluid loss additive of the present invention. They demonstrated compressive strengths ranging between 1483 and 1550 PSI. Thus, the additive of the present invention does not decrease the compressive strength of cements.

A similar trend was demonstrated in the tests conducted at 125° F., 150° F. and 170° F.

EXAMPLE V

To demonstrate that the additive of the present invention will reduce the fluid loss from cement slurries which have been formulated with salt water, a cement slurry B', D', L' and M' were prepared as were Cements B, D, L, and M of Example II except that varying concentrations of salt water was used to prepare the cementing slurry. For comparative purposes a cement slurry F was prepared as in Example II.

The fluid loss properties of these cement slurries were determined in accordance with API Spec 10, Appendix F, First Ed., January, 1982.

The following results were obtained.

TABLE V

| Cement | Concentration of Additive (gal/94 lbs cement) | NaCL wt. % | Temp. °F. | Fluid-Loss cc/30' |
|---|---|---|---|---|
| F (control) | 0 | 0.0 | 100 | +1298 |
| B' | 0.41 | 3.0 | 80 | 123 |
| B' | 0.41 | 10.0 | 80 | 134 |
| B' | 0.41 | 18.0 | 80 | 180 |
| B' | 0.41 | 37.2 | 80 | 68 |
| D' | 0.68 | 3 | 100 | 50 |
| D' | 0.68 | 3 | 125 | 48 |
| D' | 0.68 | 3 | 150 | 50 |
| D' | 0.68 | 3 | 175 | 53 |
| D' | 0.68 | 10 | 100 | 49 |
| D' | 0.68 | 10 | 125 | 46 |
| D' | 0.68 | 10 | 150 | 63 |
| D | 0.68 | 10 | 175 | 66 |
| L' | 0.80 | 3 | 100 | 43 |
| L' | 0.80 | 3 | 125 | 45 |
| L' | 0.80 | 3 | 150 | 48 |
| L' | 0.80 | 3 | 175 | 42 |
| L' | 0.80 | 10 | 100 | 49 |
| L' | 0.80 | 10 | 125 | 52 |
| L' | 0.80 | 10 | 150 | 54 |
| L' | 0.80 | 10 | 175 | 56 |
| M' | 1.00 | 18 | 200 | 94 |
| M' | 1.00 | 37.2 | 100 | 104 |
| M' | 1.00 | 37.2 | 125 | 110 |
| M' | 1.00 | 37.2 | 150 | 122 |
| M' | 1.00 | 37.2 | 175 | 130 |
| M' | 1.00 | 37.2 | 200 | 146 |

Cement F which was prepared without the additive of the present invention, exhibited a fluid loss in excess of 1298 cc during the 30 minute testing period. The cement slurries prepared with the fluid loss additive of the present invention only lost from 43 to 180 cc's during the 30 minute test period. Thus, the fluid loss additive of the present invention will reduce the water loss from cement slurries which have been formulated with salt water.

EXAMPLE VI

To demonstrate that the fluid loss additive of the present invention does not retard the rate at which the cement solidifies, cementing compositions were prepared as in Example II and the rate at which the cement thickens was determined in accordance with API, Spec 10, Section 8, First Ed., January, 1982.

The following results were obtained.

TABLE VI

| Cement | Concentration of Additive (gal/94 lbs of cement) | Temp.(°F.) | API Schedule | Thickening Time[1] (in hours) 70 Bc | 100 Bc |
|---|---|---|---|---|---|
| F | 0.00 | 80 | 1g3 | 4:45 | 4:57 |
| B | 0.41 | 80 | 1g3 | 4:11 | 4:25 |
| C | 0.68 | 80 | 1g3 | 5:08 | 5:19 |
| F | 0.00 | 100 | 3g4 | 2:49 | 3:14 |
| B | 0.41 | 100 | 3g4 | 2:54 | 3:28 |
| C | 0.68 | 100 | 3g4 | 3:02 | 3:30 |
| F | 0.00 | 125 | 5g3 | 1:36 | 1:46 |
| B | 0.41 | 125 | 5g3 | 1:43 | 1:47 |
| C | 0.68 | 125 | 5g3 | 1:52 | 2:00 |

[1]Variations of 30 minutes or less in thickening time is considered within normal experimental error.

Cement F which does not contain the fluid loss additive of the present invention, thickened in 4 hours and 45 minutes when tested at 80° F.

Cements B and C which contained the additive of the present invention, thickened in 4 hours, 11 minutes; and 5 hours, 8 minutes; respectively.

Although at first glance it appears that the additive of the present invention retarded the rate at which Cement C solidified, this is not the case.

Due to the large amount of experimental error inherent in the testing procedures, cements which thicken within 30 minutes of each other are considered to have equivalent thickening rates. Therefore, the additive of the present invention does not delay the rate at which cement slurries solidify.

EXAMPLE VII

This example presents data on fluid loss in cements as performed according to conventional API cement tests. The tests were performed according to appendix F with well-simulation as outlined in paragraph d relative to atmospheric pressure simulation. The results are recorded in Table VII.

TABLE VII

| | API Water Loss in Fresh Water, cc/30 minutes | | |
|---|---|---|---|
| | polymer composition in weight % | 125° F. | |
| ID No. | AM/NAc/AMPS/NVP | cc/30 min. | conc. added |
| 1 | 3/15.5/61/20.5 | 275 | 0.24% |
| 2 | 50/30/10/10 | 208 | 0.24% |
| 3 | 37.1/18.2/33.1/11.1 | 413 | 0.24% |
| 4 | 35/30/15/30 | 202 | 0.24% |
| 5 | 15.6/9.4/25/50 | 738 | 0.24% |
| 6 | 13.7/2.1/63.0/21.2 | 388 | 0.24% |
| 7 | 5/55/30/10 | 77 | 0.24% |
| 8 | 2/3/90/5 | 716 | 0.24% |
| 9 | 5/20/15/60 | 376 | 0.24% |
| 10 | 55/20/15/10 | 102 | 0.24% |
| 11 | 60/10/10/20 | 148 | 0.24% |
| 12 | 45/25/10/20 | 136 | 0.24% |
| 13 | 45/20/15/20 | 108 | 0.24% |
| 14 | 45/10/25/20 | 128 | 0.24% |
| 15 | 35/10/35/20 | 135 | 0.24% |
| 16 | 30/10/40/20 | 114 | 0.24% |
| 17 | 30/15/35/20 | 110 | 0.24% |
| 18 | 26.6/16.0/42.4/15 | 118 | 0.24% |
| 19 | 25/15/40/20 | 114 | 0.24% |
| 20 | 60/20/10/10 | 88 | 0.24% |
| 21 | 35/15/30/20 | 88 | 0.24% |
| 22 | 34/14/30/22 | 82 | 0.24% |
| 23 | 33/14/28/25 | 91 | 0.24% |
| 24 | 32/13/27/28 | 86 | 0.24% |
| 25 | 23.5/14.0/37.5/25 | 90 | 0.24% |

TABLE VII-continued

API Water Loss in Fresh Water, cc/30 minutes

| ID No. | polymer composition in weight % AM/NAc/AMPS/NVP | 125° F. cc/30 min. | conc. added |
|---|---|---|---|
| 26 | 5/55/30/10 | 77 | 0.24% |

Note:
Concentration of polymer added in % by weight of cement (BWOC).
AM = acrylamide
NAc = sodium acrylate
AMPS ™ = acrylamidomethylpropane sulfonate (trademark of Lubrizol)
NVP = n-vinylpyrrolidone This data indicates that these polymers are effective in reducing water loss in drilling cements.

EXAMPLE VIII

This example presents data on fluid loss in cements as performed according to conventional API cement tests. The tests were performed according to appendix F with well-simulation as outlined in paragraph D relative to atmospheric pressure simulation. The results are recorded in Table VIII.

TABLE VIII

API Water Loss in Fresh Water, cc/30 minutes

| ID No. | polymer composition in weight % AM/NAc/AMPS/NVP | 200° F. cc/30 min. | conc. added |
|---|---|---|---|
| 1 | 15.6/9.4/25/50 | 728 | 0.33% |
| 2 | 13.7/2.1/63.1/21.1 | 814 | 0.33% |
| 3 | 2/3/90/5 | 717 | 0.33% |
| 4 | 55/20/15/10 | 115 | 0.33% |
| 5 | 50/30/10/10 | 132 | 0.33% |
| 6 | 37.1/18.2/33.1/11.1 | 100 | 0.33% |
| 7 | 35/30/15/30 | 100 | 0.33% |
| 8 | 18.8/11.2/30/40 | 260 | 0.33% |
| 9 | 5/20/15/60 | 153 | 0.33% |
| 10 | 5/55/30/10 | 103 | 0.33% |
| 11 | 45/10/25/20 | 52 | 0.33% |
| 12 | 60/20/10/10 | 56 | 0.33% |
| 13 | 60/10/10/20 | 76 | 0.33% |
| 14 | 50/20/10/20 | 77 | 0.33% |
| 15 | 35/15/30/20 | 50 | 0.33% |
| 16 | 32/13/27/28 | 55 | 0.33% |
| 17 | 30/10/40/20 | 53 | 0.33% |
| 18 | 26.6/16/42.4/15 | 52 | 0.33% |
| 19 | 25/10/45/20 | 54 | 0.33% |
| 20 | 25/15/40/20 | 50 | 0.33% |
| 21 | 25/20/35/20 | 57 | 0.33% |
| 22 | 20/15/45/20 | 56 | 0.33% |
| 23 | 20/10/50/20 | 54 | 0.33% |
| 24 | 15/10/55/20 | 58 | 0.33% |
| 25 | 3/15.5/61/20.5 | 97 | 0.33% |
| 26 | 34/14/30/22 | 46 | 0.33% |
| 27 | 33/14/28/25 | 46 | 0.33% |
| 28 | 30/15/35/20 | 47 | 0.33% |
| 29 | 23.5/14/37.5/25 | 45 | 0.33% |
| 30 | 35/10/35/20 | 54 | 0.33% |
| 31 | 32/13/27/28 | 55 | 0.33% |
| 32 | 45/25/10/20 | 56 | 0.33% |

Note:
Cement slurries tested at 200° F. contain 35% silica sand BWOC (by weight of cement) and concentration of polymer added is in % BWOC.
AM = acrylamide
NAc = sodium acrylate
AMPS ™ = acrylamidomethylpropane sulfonate (trademark of Lubrizol)
NVP = n-vinyl pyrrolidone This data indicates that these polymers are effective in reducing water loss in drilling cements.

EXAMPLE IX

This example presents data on fluid loss in cements as performed according to conventional API cement tests. The tests were performed according to appendix F with well-simulation as outlined in paragraph d relative to atmospheric pressure simulation. The results are recorded in Table IX.

TABLE IX

API Water Loss in Fresh Water, cc/30 minutes

| ID No. | polymer composition in weight % AM/NAc/AMPS/NVP | 300° F. cc/30 min. | conc. added |
|---|---|---|---|
| 1 | 60/20/10/10 | 254 | 0.36% |
| 2 | 55/20/15/10 | 259 | 0.36% |
| 3 | 50/20/10/20 | 221 | 0.36% |
| 4 | 45/25/10/20 | 227 | 0.36% |
| 5 | 35/30/15/30 | 245 | 0.36% |
| 6 | 15.6/9.4/25/50 | 1232 | 0.36% |
| 7 | 13.6/2.1/63.1/21.2 | 1041 | 0.36% |
| 8 | 5/20/15/60 | 1408 | 0.36% |
| 9 | 2/3/90/5 | 1275 | 0.36% |
| 10 | 60/10/10/20 | 138 | 0.36% |
| 11 | 50/30/10/10 | 137 | 0.36% |
| 12 | 45/20/15/20 | 172 | 0.36% |
| 13 | 45/10/25/20 | 118 | 0.36% |
| 14 | 37.1/18.7/33.1/11.1 | 154 | 0.36% |
| 15 | 35/10/35/20 | 176 | 0.36% |
| 16 | 30/10/40/20 | 124 | 0.36% |
| 17 | 25/10/45/20 | 122 | 0.36% |
| 18 | 20/10/50/20 | 106 | 0.36% |
| 19 | 3/16/61/20 | 108 | 0.36% |
| 20 | 35/15/30/20 | 86 | 0.36% |
| 21 | 34/14/30/22 | 85 | 0.36% |
| 22 | 33/14/28/25 | 84 | 0.36% |
| 23 | 32/13/27/28 | 92 | 0.36% |
| 24 | 30/15/35/20 | 91 | 0.36% |
| 25 | 25/15/40/20 | 94 | 0.36% |
| 26 | 25/20/35/20 | 78 | 0.36% |
| 27 | 23.5/14.1/37.5/25 | 77 | 0.36% |
| 28 | 20/15/45/20 | 90 | 0.36% |
| 29 | 15/10/55/20 | 88 | 0.36% |
| 30 | 5/55/30/10 | 44 | 0.36% |

Note:
Cement slurries tested at 300° F. contain 35% silica sand BWOC (by weight of cement) and concentration of polymer added is in % BWOC.
AM = acrylamide
NAc = sodium acrylate
AMPS ™ = acrylamidomethylpropane sulfonate (trademarkark of Lubrizol)
NVP = n-vinyl pyrrolidone This data indicates that these polymers are effective in reducing water loss in drilling cements.

EXAMPLE X

This example presents data on fluid loss in cements as performed according to conventional API cement tests. The tests were performed according to appendix F with well-simulation as outlined in paragraph d relative to atmospheric pressure simulation. The results are recorded in Table X.

TABLE X

API Water Loss in 10% NaCl, cc/30 minutes

| ID No. | polymer composition in weight % AM/NAc/AMPS/NVP | 200° F. cc/30 min. | conc. added |
|---|---|---|---|
| 1 | 15.6/9.4/25/50 | 680 | 0.3% |
| 2 | 13.6/2.1/63.1/21.2 | 1107 | 0.3% |
| 3 | 5/55/30/10 | 1833 | 0.3% |
| 4 | 2/3/90/5 | 1177 | 0.3% |
| 5 | 60/10/10/20 | 238 | 0.3% |
| 6 | 55/20/15/10 | 200 | 0.3% |
| 7 | 50/30/10/10 | 212 | 0.3% |
| 8 | 37/18/33/12 | 206 | 0.3% |
| 9 | 3/15.5/61/20.5 | 272 | 0.3% |
| 10 | 60/20/10/10 | 192 | 0.3% |
| 11 | 50/20/10/20 | 150 | 0.3% |
| 12 | 45/25/10/20 | 102 | 0.3% |
| 13 | 35/10/35/20 | 115 | 0.3% |
| 14 | 35/30/15/30 | 148 | 0.3% |
| 15 | 30/10/40/20 | 109 | 0.3% |
| 16 | 30/15/35/20 | 119 | 0.3% |
| 17 | 27/16/43/15 | 120 | 0.3% |

TABLE X-continued

API Water Loss in 10% NaCl. cc/30 minutes

| ID No. | polymer composition in weight % AM/NAc/AMPS/NVP | 200° F. cc/30 min. | conc. added |
|---|---|---|---|
| 18 | 25/10/45/20 | 106 | 0.3% |
| 19 | 20/10/50/20 | 118 | 0.3% |
| 20 | 15/10/55/20 | 120 | 0.3% |
| 21 | 45/20/15/20 | 98 | 0.3% |
| 22 | 45/10/25/20 | 92 | 0.3% |
| 23 | 35/15/30/20 | 96 | 0.3% |
| 24 | 34/14/30/22 | 64 | 0.3% |
| 25 | 33/14/28/25 | 72 | 0.3% |
| 26 | 32/13/27/28 | 80 | 0.3% |
| 27 | 25/15/40/20 | 80 | 0.3% |
| 28 | 25/20/35/20 | 96 | 0.3% |
| 29 | 23.5/14/37.5/25 | 84 | 0.3% |
| 30 | 20/15/45/20 | 88 | 0.3% |

Note:
Concentration of polymer added in % by weight of cement (BWOC).
AM = acrylamide
NAc = sodium acrylate
AMPS ™ = acrylamidomethylpropane sulfonate (trademark of Lubrizol)
NVP = n-vinyl pyrrolidone

EXAMPLE XI

All polymers were prepared using a bulk solution polymerization with a free radical initiator in a stoichiometric excess (approximately 100% excess). The initiator used was 2,2'-azobis (N,N'-dimethyleneisobutyramidine) dihydrochloride. The monomers were added in the desired weight percent ratio, with water being added to achieve the desired solids content. EDTA (ethylenediaminetetraacetic acid), a chelating agent, was also added in a stoichiomeric excess. The system was thoroughly purged with an inert gas, and the monomers were allowed to react at temperatures in the range of 20° to 60° C.

Reasonable variations can be made in view of the foregoing disclosure without departing from the spirit or scope of the present invention.

That which is claimed is:

1. The tetrapolymer product of the polymerization of at least four monomer components consisting essentially of:
   (a) about 28 percent to about 38 weight percent of component A which is selected from the group consisting of 2-acrylamido-2-methylpropane sulfonic acid and salts of 2-acrylamido-2-methylpropane sulfonic acid;
   (b) about 20 weight percent to about 25 weight percent of component B which is N-vinyl-2-pyrrolidone;
   (c) about 23 weight percent to about 34 weight percent of component C which is acrylamide; and
   (d) about 14 weight percent to about 15 weight percent of component D which is selected from the group consisting of acrylic acid and salts of acrylic acid.

2. A tetrapolymer product of the polymerization of at least four monomer components consisting essentially of:
   (a) at least 50 weight percent to 60 weight percent of component A is sodium 2-acrylamido-2-methylpropane sulfonate;
   (b) at least 30 weight percent to 40 weight percent of component B which is N-vinyl-2-pyrrolidone;
   (c) at least 5 weight percent to 15 weight percent of component C which is acrylamide; and
   (d) at least 1 weight percent to 10 weight percent of component D which is acrylic acid.

3. A tetrapolymer product of the polymerization of at least four monomer components consisting essentially of:
   (a) about 30 weight percent of component A which is selected from the group consisting of 2-acrylamido-2-methylpropane sulfonic acid and salts of 2-acrylamido-2-methylpropane sulfonic acid;
   (b) about 10 weight percent of component B which is N-vinyl-2-pyrrolidone;
   (c) about 5 weight percent of component C which is acrylamide; and
   (d) about 55 weight percent of component D which is selected from the group consisting of acrylic acid and salts of acrylic acid.

4. A tetrapolymer product of the polymerization of at least four monomer components consisting essentially of:
   (a) about 30 weight percent of component A which is selected from the group consisting of 2-acrylamido-2-methylpropane sulfonic acid and salts of 2-acrylamido-2-methylpropane sulfonic acid;
   (b) about 22 weight percent of component B which is N-vinyl-2-pyrrolidone;
   (c) about 34 weight percent of component C which is acrylamide; and
   (d) about 14 weight percent of component D which is selected from the group consisting of acrylic acid and salts of acrylic acid.

* * * * *